United States Patent

Sasaki

[19]

[11] Patent Number: 5,930,211

[45] Date of Patent: Jul. 27, 1999

[54] TRACKING SERVO APPARATUS FOR OPTICAL DISC

[75] Inventor: Yasuo Sasaki, Kanagawa, Japan

[73] Assignee: Sony Corporation, Tokyo, Japan

[21] Appl. No.: 08/729,849

[22] Filed: Oct. 15, 1996

[30] Foreign Application Priority Data

Oct. 19, 1995 [JP] Japan .................................. 7-296268

[51] Int. Cl.$^6$ ...................................................... G11B 7/09
[52] U.S. Cl. .................................. 369/44.29; 369/44.34; 369/44.35; 369/54
[58] Field of Search ........................ 369/44.27, 44.29, 369/44.34, 44.35, 44.36, 54, 44.41

[56] References Cited

U.S. PATENT DOCUMENTS

| | | | |
|---|---|---|---|
| 4,866,688 | 9/1989 | Ohtake et al. . | |
| 5,048,002 | 9/1991 | Horie et al. ........................... | 369/44.35 |
| 5,189,653 | 2/1993 | Yanagi .................................. | 369/44.34 |
| 5,210,732 | 5/1993 | Suenaga et al. ...................... | 369/44.29 |
| 5,253,239 | 10/1993 | Edahiro et al. ...................... | 369/44.29 |
| 5,268,883 | 12/1993 | Yamaguchi et al. ................. | 369/44.29 |
| 5,341,353 | 8/1994 | Yoshio et al. ........................ | 369/44.28 |
| 5,347,503 | 9/1994 | Koyama et al. . | |
| 5,408,452 | 4/1995 | Sakemoto et al. . | |
| 5,517,474 | 5/1996 | Takamine ............................. | 369/44.29 |

FOREIGN PATENT DOCUMENTS

| | | |
|---|---|---|
| 0 221 782 | 5/1987 | European Pat. Off. . |
| 0 423 731 | 4/1991 | European Pat. Off. . |
| 0 502 713 | 9/1992 | European Pat. Off. . |
| 0 541 209 | 5/1993 | European Pat. Off. . |

OTHER PUBLICATIONS

Patent Abstracts of Japan vol. 013, No. 253 (P–883), Jun. 13, 1989 & JP 01 050244 A (Fujitsu General Ltd.), Feb. 27, 1989.

Patent Abstracts of Japan vol. 016, No. 005 (P–1295), Jan. 8, 1992 & JP 03 22831 A (Matsushita Electric Ind Co Ltd), Oct. 9, 1991.

Patent Abstracts of Japan vol. 018, No. 445 (P–1789), Aug. 18, 1994 & JP 06 139587 A (Taiyo Yuden Co. Ltd.) May 20, 1994.

Patent Abstracts of Japan vol. 013, No. 520 (P–963), Nov. 21, 1989 & JP 01 211326 A (Matsushita Electric Ind Co Ltd), Aug. 24, 1989.

Patent Abstracts of Japan vol. 012, No. 151 (P–699), May 11, 1988 & JP 62 267929 A (Hitachi Ltd.), Nov. 20, 1987.

*Primary Examiner*—Thang V. Tran
*Attorney, Agent, or Firm*—Frommer Lawrence & Haug, LLP; William S. Frommer; Dennis M. Smid

[57] ABSTRACT

A tracking servo device for use with an optical disc apparatus includes a photodetector unit having a plurality of photodetectors each of which is split in association with the direction of tracks formed on the optical disc, and a tracking error generating unit for finding the difference in outputs from at least two of the photodetectors of the photodetector unit for generating a tracking error signal. The tracking servo device also includes a first correction unit for removing an offset produced in the tracking error signal when the tracking servo is on, and a second correction unit for removing an offset produced in the tracking error signal when the tracking servo is off. The tracking servo device also includes a switching unit for selecting the first correction unit or the second correction unit when the tracking servo is on or off, respectively, for producing a tracking error signal freed of the offset component, and an offset holding unit for holding an offset component extracted by the second correction unit. The tracking servo device further includes a control unit for controlling the holding time of the offset component in the offset holding unit.

4 Claims, 11 Drawing Sheets

TRACKING SERVO APPARATUS FOR OPTICAL DISC

BACKGROUND OF THE INVENTION

1. Field of the Invention

This invention relates to a tracking servo device employed for an optical apparatus for reproducing the information recorded on an optical disc, or recording the information on the optical disc, such as a recording and/or reproducing apparatus for a magneto-optical disc or a recording and/or reproducing apparatus for a phase-transition optical disc.

2. Description of the Related Art

In a pre-groove formed on, for example, a magneto-optical disc used in a magneto-optical disc apparatus, wobbling signals, as the address information, are sometimes recorded. An optical pickup used for reproducing the information recorded on this sort of the magneto-optical disc or recording the information thereon performs tracking servo in such a manner that a light beam from a light source is radiated on the surface of the magneto-optical disc and a light beam from the magneto-optical disc is received by a light receiving unit segmented into plural sensors. The tracking error signal of the so-called push-pull system is detected based on the difference of the light volumes received by the segmented sensors. Tracking servo is performed by the optical pickup based on this tracking error signal.

Meanwhile, if a wobbled groove having a pre-set amplitude and a pre-set frequency is formed on a data track of the magneto-optical disc, such wobbled frequency components are contained in an output signal of the segmented sensors of the light receiving unit. The amplitude of these wobbled frequency components are varied depending on the position of the objective lens of the optical pickup. This feature may be exploited for detecting the position of the objective lens for canceling an offset produced in a tracking error signal, as proposed in JP Patent Application No.6-285389. The system of canceling the offset value produced in the tracking error signal is termed a wobble push-pull (WPP) method.

The wobble push-pull method, exploiting the wobbled frequency components, cannot be used if the tracking servo is off. If the tracking servo is off, a track-on circuit is used for canceling the offset value of the tracking error signal in place of the WPP circuit, as proposed in WO 95/31806 (International Publication Number).

A changeover circuit is used for switching between these two canceling circuits, that is the wobble push-pull circuit and the track-on circuit. Specifically, the changeover circuit connects to the WPP circuit or to the track-on circuit when the tracking servo is on or off, respectively, for removing the offset value for producing a correct tracking error signal.

The reasons the changeover circuit has to switch between the wobble push-pull circuit and the track-on circuit depending on the tracking servo on/off state are as follows: Since the WPP circuit exploits the wobbled frequency components contained in the detection signal by the optical pickup, it cannot operate correctly unless tracking servo is on and disc rotation is locked to constant linear velocity (CLV). That is, the WPP circuit cannot be used if tracking servo is off, as described above.

Since the track-on circuit holds the offset value of the tracking error at the instant of turning the tracking servo on, the offset value held by the track-on circuit ceases to be correct if the objective lens is moved to follow up with tracks. By these reasons, it becomes necessary for the above-described changeover circuit to switch between the WPP circuit and the track-on circuit depending on the tracking servo on/off state.

Figure 1:
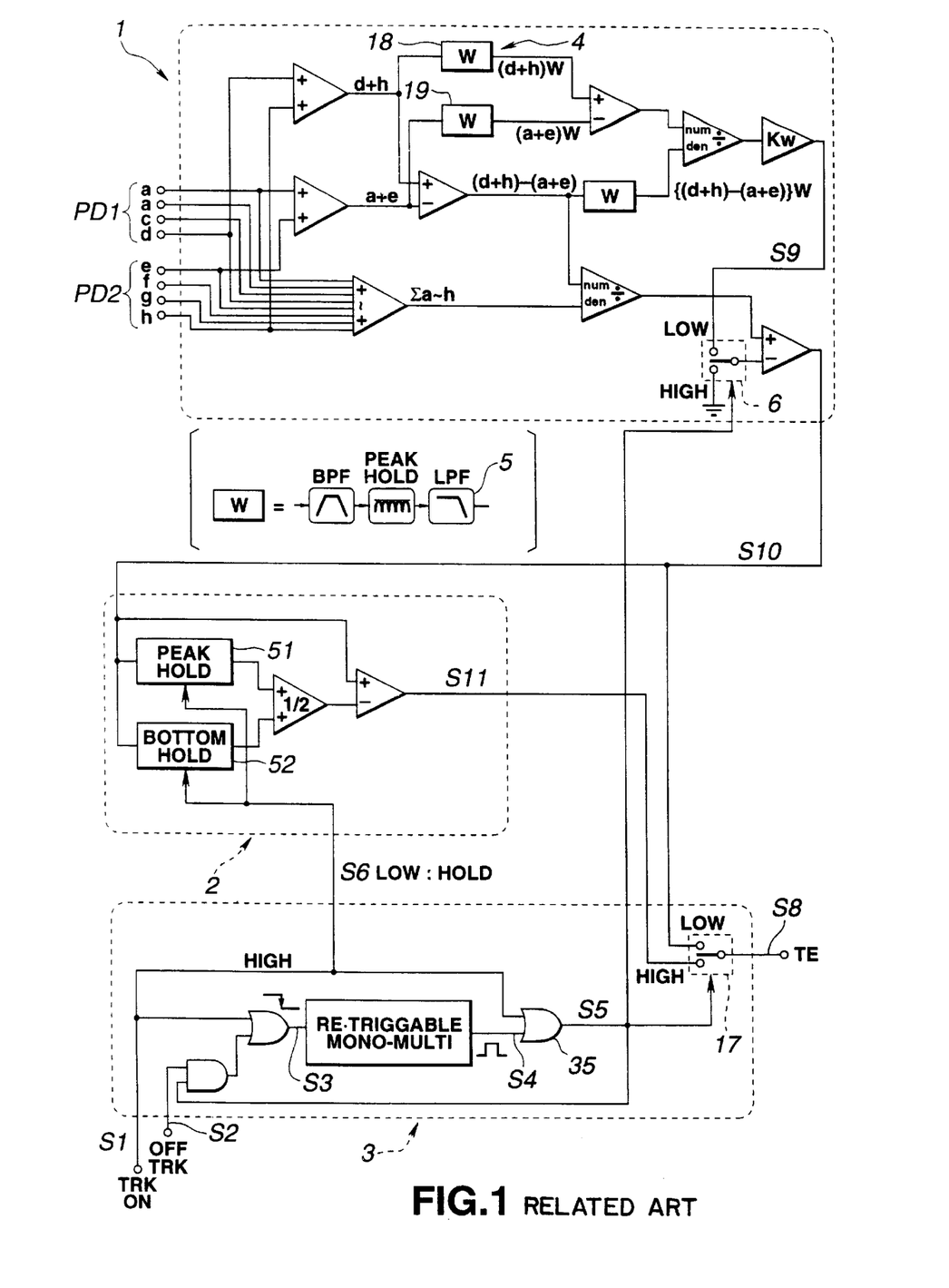
FIG. 1 is a circuit diagram showing a comparative example of a tracking servo device.

FIG. 1 shows an illustrative structure of a WPP circuit 1, a track-on circuit 2 and a changeover circuit 3 as proposed by the present Assignee.

In the switching system of the cancellation circuit, shown in FIG. 1, the changeover circuit 3 switches between the two cancellation circuits, that is the WPP circuit 1 and the track-on circuit 2.

Figure 2:
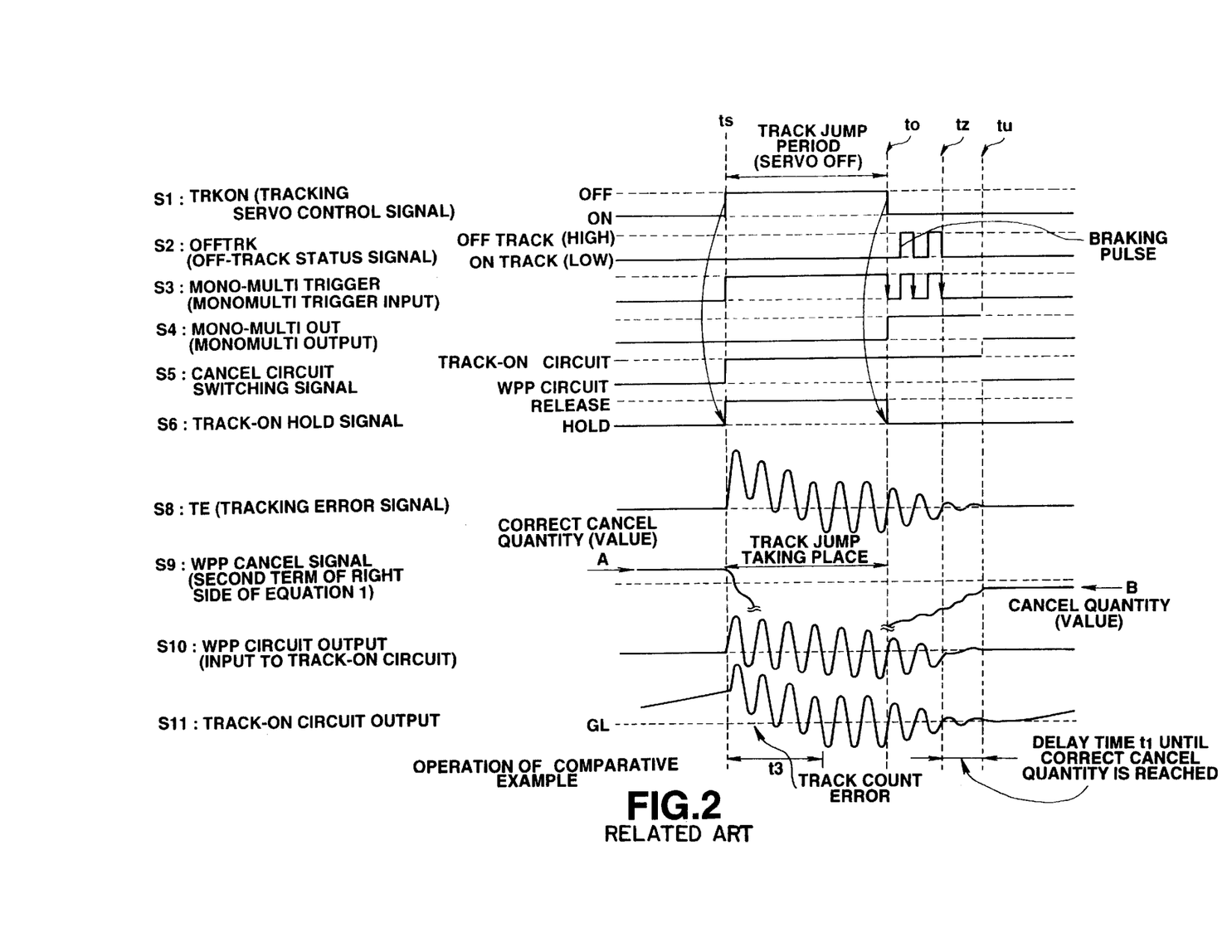
FIG. 2 shows signal waveforms at various portions of the comparative example of the tracking servo device.

FIG. 2 shows the states of signals of various portions of FIG. 1 since the time when tracking servo so far turned on is turned off at time ts to cause track jump to move an objective lens until the time when tracking servo is again turned on (on and after time t0).

A tracking servo control signal S1 is a control signal indicating tracking servo on/off and turns tracking servo off and on with its high and low states, respectively. A tracking status signal S2 is a signal indicating the off-track state. The tracking status signal S2 is used in a braking circuit for improving recovery characteristics directly after turning on tracking servo at time t0 and also termed a braking pulse. The signal S1 is low or high when the light from the light source is on-track or off-track, respectively.

A cancellation circuit changeover signal S5 operates so that, during the time when tracking servo is off (since time point ts until time point t0) and during the time when tracking servo is on, the braking pulse (off-track status signal S2) subsides and the WPP circuit 1 again operates correctly (since time point tz until time point tu), an output of the track-on circuit 2 becomes a tracking error signal TE, and so that, during the time other than the time periods specified above, an output of the WPP circuit 1 will become the tracking error signal TE.

A track-on hold signal S6 is a signal for hold/release switching of the offset value of the tracking error signal TE as detected by the track-on circuit 2, and sets the hold state since a time instant when the tracking servo is turned on until the tracking servo is next turned off. This track-on hold signal S6 is coincident with the tracking servo control signal S1.

A WPP cancellation signal S9 of FIG. 2 is a cancellation signal in the WPP circuit 1 of FIG. 1 (equivalent to the second term of the right side of the following equation (1) for the tracking error signal:

$$TE = \frac{(a+e)-(d-h)}{IG} - KW \cdot \frac{(a+e)-(d-h)W}{\{(a+e)-(d+h)\}W} \quad (1)$$

As long as tracking servo is on, the WPP cancellation signal S9 indicates a correct cancellation value A. However, during track jump, (during tracking servo off time, that is the time since time point ts until time point to), there is no correct wobbling signal present in the WPP circuit, because tracking servo is off. Further, depending on the jump speed, the traverse signal of the tracking error signal is sometimes degraded to the wobbled frequency, in which case the cancellation value becomes an incorrect value.

Tracking servo is then turned on at time point t0, from its off state, so that a correct wobbling signal enters the WPP circuit 1. However, because of the long time constant of a low-pass filter LPF of wobbling amplitude detector 4 (FIG. 1), a long delay time t1 has to elapse until the WPP cancellation signal S9 reaches a correct cancellation value B. This delay time t1 is on the order of, for example, five milliseconds. That is, the delay time t1 has to elapse since the tracking servo, so far turned off, is turned on and rotation of the magneto-optical disc becomes locked to CLV until the cancellation value of the WPP cancellation signal S9 of the WPP circuit 1 becomes a correct value.

It should be noted that an output S10 of the WPP circuit is simultaneously an output of the WPP circuit 1 and an input to the track-on circuit 2. However, the track-on circuit remains unaffected as long as the track-on circuit 2 is selected by the cancellation circuit changeover signal S5, since then the changeover switch 6 overrides WPP cancellation signal S9.

A track-on circuit output S11 is controlled so that, as long as tracking servo is on, an offset value of a tracking error signal detected by the track-on circuit 2 when the tracking servo is changed over from its off state to its on state is held by the tracking hold signal S6. Specifically, the potential of a capacitor for holding the track-on circuit 2 should not be changed. However, in effect, minor current inevitably flows through this capacitor to change the capacitor potential. Moreover, the time during which the tracking servo is on is significantly longer than the time during which the tracking servo is off, so that the amount of deviation caused during such time sometimes is increased to an non-negligible level. In the worst case, the amount of deviation reaches a level which cannot be canceled with the response rate of the track-on circuit 2 when the tracking servo is changed over from its off state to its on state. In such case, zero-crossing of the traverse signal of the tracking error signal TE through a ground line GL does not occur during the time t3, as shown in FIG. 2, thus occasionally producing track count errors by a track counter, not shown, during track jump time. In this case, track addresses are read after the time point tu to find that the target track has been passed over, so that the time points ts–tu are repeated once or several times by track jump in the reverse direction before reaching the target track. The result is the prolonged overall accessing time at the time of track jump.

In addition, with the magneto-optical disc apparatus, the laser power under the recording mode is approximately ten times that under the reproduction mode, such that the signal level of respective signals outputted by the light receiving unit is changed proportionately.

Of course, the dynamic range for which sufficient precision may be realized in an integrated circuit (IC) executing the processing of the WPP circuit 1 is the broader the higher the source voltage.

However, in a portable magneto-optical disc apparatus, it is difficult to raise the source voltage to 3 V or higher, such that a lower voltage is preferentially used. Consequently, emphasis is placed on coping with the recording/reproducing modes in the magneto-optical disc apparatus such that the processing recision is neglected as a result of which a laser light spot on the magneto-optical disc is deviated from a data track (detracking).

SUMMARY OF THE INVENTION

It is therefore an object of the present invention to provide a tracking servo device for an optical apparatus whereby track jump time can be reduced and tracking servo can be improved in accuracy.

In one aspect, the present invention provides a tracking servo apparatus for an optical disc including photodetector means having a plurality of photodetectors each of which is segmented in association with the direction of tracks formed on the optical disc, tracking error generating means for finding the difference in outputs from at least two of the photodetectors of the photodetector means for generating a tracking error signal, first correction means for removing an offset produced in the tracking error signal when the tracking servo is on, second correction means for removing an offset produced in the tracking error signal when the tracking servo is off, switching means for selecting the first correction means or the second correction means when the tracking servo is on or off, respectively, for producing a tracking error signal freed of the offset component, and holding means for holding a cancellation value for canceling the offset component extracted by the first correction means.

In the first aspect of the present invention, if a data track is wobbled, and wobbled frequency components are contained in an output signal of the light receiving means, the first correction means cancels the offset generated in the tracking error signal during tracking servo on period. The second correction means cancels the offset value generated in the tracking error signal during tracking servo off time period.

The changeover means switch to the first correction means and to the second correction means during the tracking servo on time and during the tracking servo off time, respectively, for generating a tracking error signal freed of the offset value.

The holding means holds the cancellation value used for canceling the offset value in the first correction means at a time directly before switching of the tracking servo from on to off. In this manner, the cancellation value held by the holding means can be used as an initial value when the first correction means is used next time, that is when the tracking servo is changed over from off to on, thereby reducing the time since turning on of tracking servo until outputting of the correct cancellation value by the first correction means.

In a second aspect, the present invention provides a tracking servo device in an optical apparatus in which the return light from an optical disc is received by a light receiving unit and a tracking error signal is detected on the basis of a difference in the light volume in plural segmented sensors of the light receiving unit. The tracking servo device includes first correction means for canceling an offset value generated in the tracking error signal when the tracking servo is on, if a data track is wobbled and wobbled frequency components are contained in a output signal of the light receiving unit, and second correction means for canceling an offset value produced in the tracking error signal during tracking servo off period. The tracking servo device further includes changeover means for switching to first correction means and to second correction means during tracking servo on period, and holding time setting means for setting the holding time for the offset value in the second correction means during the time since turning on of the tracking servo until the time of switching to the first correction means by the second correction means.

In the second aspect of the present invention, if a data track is wobbled and wobbled frequency components are contained in a output signal of the light receiving unit, the offset value produced in the tracking error signal during tracking servo on time is canceled. The second correction means cancel the offset value generated in the tracking error signal during tracking servo off period.

The changeover means connect to the first correction means or to the second correction means during tracking servo on period or tracking servo off period, respectively, for deriving a tracking error signal freed of the offset value.

The holding time setting means sets the offset value holding time in the second correction means to a time period since the time the tracking servo is changed over from off to on until the time of switching from the second correction means to the first correction means. That is, the offset value hold time is reduced to the time since the time of switching the tracking servo from off state to on state until switching to the first correction means. This reduces the occurrence of track counting errors for shortening the track jump time.

In a third aspect, the present invention provides a tracking servo device in an optical apparatus in which the return light from an optical disc is received by a light receiving unit and a tracking error signal is detected on the basis of a difference in the light volume in plural segmented sensors of the light receiving unit. The tracking servo device includes first correction means for canceling an offset value generated in the tracking error signal when the tracking servo is on, if a data track is wobbled and wobbled frequency components are contained in a output signal of the light receiving unit, and second correction means for canceling an offset value produced in the tracking error signal during tracking servo off period. The tracking servo device further includes changeover means for switching to first correction means and to second correction means during tracking servo on period, and holding time setting means for setting the holding time for the offset value in the second correction means during the time since turning on of the tracking servo until the time of switching to the first correction means by the second correction means, and discrimination adjustment means arranged on the first correction means for judging, based on the output signal level of the light receiving unit, whether the light beam radiated on the optical disc is in the recording mode or in the playback mode for adjusting the output signal level of the light receiving unit.

In the third aspect of the present invention, if a data track is wobbled and wobbled frequency components are contained in a output signal of the light receiving unit, the offset value produced in the tracking error signal during tracking servo on time is canceled. The second correction means cancel the offset value generated in the tracking error signal during tracking servo off period.

The changeover means connect to the first correction means or to the second correction means during tracking servo on period or tracking servo off period, respectively, for deriving a tracking error signal freed of the offset value.

The discrimination adjustment means judges, based on the output signal level of the light receiving unit, whether the light beam radiated on the optical disc is in the recording mode or in the reproducing mode, for adjusting the output signal level of the light receiving unit.

In the third aspect, the discrimination adjustment means changes over the level of the input signal of the first correction means. In this manner, it can be judged whether the laser light radiated on the optical disc is in the recording mode or in the playback mode, thus improving accuracy in tracking servo operations and prohibiting detracking from occurring.

In a fourth aspect, the present invention provides a tracking servo device in an optical apparatus in which the return light from an optical disc is received by a light receiving unit and a tracking error signal is detected on the basis of a difference in the light volume in plural segmented sensors of the light receiving unit. The tracking servo device includes first correction means for canceling an offset value generated in the tracking error signal when the tracking servo is on, if a data track is wobbled and wobbled frequency components are contained in a output signal of the light receiving unit, and second correction means for canceling an offset value produced in the tracking error signal during tracking servo off period. The tracking servo device also includes changeover means for switching to first correction means or to second correction means during tracking servo on period or track servo off period, respectively, and holding means for holding a peak hold value in the wobbling amplitude detection unit in the first correction means for holding a cancellation value used for canceling an offset value in the first correction means during tracking servo off time, and holding time setting means for setting the holding time for the offset value in the correction means to a time period since tracking servo on time until the time of switching from the second correction means to the first correction means.

In the fourth aspect, the holding means holds the cancellation value for canceling the offset value in the first correction means during tracking servo off time. Thus, when the first correction means is used next time, that is when the tracking servo is turned on next time, the cancellation value held by the holding means can be used as an initial value. This reduces the time which elapses since the tracking servo is on until the first correction means gives a correct cancellation value, thus shortening the track jump time.

The holding time setting means sets the offset value holding time by the second correction means to a time period since the turning on of the tracking servo until the time of switching from the second correction means to the first correction means. That is, the holding time of the offset value by the second correction means is shortened to a time period since the time instant of turning on of the tracking servo until the time of switching to the first correction means. This reduces the track count errors and the track jump time.

In sum, in the first aspect, the holding means holds the cancellation value used for canceling the offset value in the first correction means during tracking servo off time. Thus, if the first correction means is used next time, that is when the tracking servo is on next time, the cancellation value held by the holding means can be used as an initial value for obtaining the correct cancellation value when the tracking servo is turned on next time. This reduces the track jump time by shortening the time since the tracking servo is on until the first correction means gives a correct value.

In the second aspect, the holding time setting means sets the offset value setting means by the second correction means to a time period since the time of turning on of the tracking servo until the time of switching from the second correction means to the first correction means. That is, the offset value hold time by the second correction means is set to a shortened time period since the time instant of turning on of the tracking servo until the time of switching to the first correction means. This reduces the track count errors and the time required for track jump.

In the third aspect, the discrimination adjustment means judges, based on the output signal level of the light receiving unit, whether the light radiated on the optical disc is in the recording mode or in the reproducing mode, for adjusting the output signal level of the light receiving unit. The discrimination adjustment means switches the input signal level of the first correction means. This improves the tracking servo calculation accuracy for preventing detracking from occurring because it can be judged whether the optical disc is in the recording mode or in the playback mode.

In the fourth aspect, the holding means holds the cancellation value for canceling the offset value in the first correction mans during track servo off time. Thus, if the first correction means is used next time, that is when the tracking servo is on next time, the cancellation value held by the holding means can be used as an initial value for obtaining the correct cancellation value when the tracking servo is on next time. This reduces the time since the tracking servo is on until the first correction means gives a correct value for reducing the track jump time.

DESCRIPTION OF THE PREFERRED EMBODIMENTS

Referring to the drawings, preferred embodiments of the present invention will be explained in detail.

The preferred embodiments of the present invention represent preferred form of execution of the invention and therefore technically desirable limitations of various sorts are imposed thereon. However, the scope of the present invention is not limited to these preferred forms in the absence of contrary statements.

First Embodiment

Figure 3:
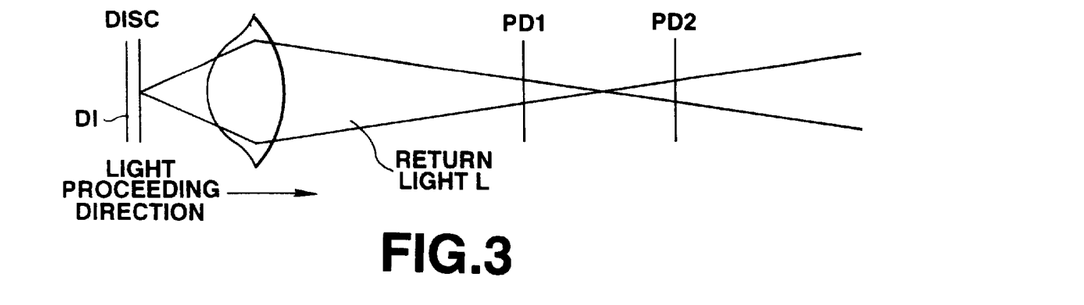
FIG. 3 shows an illustrative return light optical system of an optical apparatus according to the present invention.

FIG. 3 shows an example of execution of an optical system for the return light from, for example, a magneto-optical disc apparatus. In FIG. 3, an optical system for the return light is of a one-spot push-pull tracking servo system in which a wobble formed on a track of the magneto-optical disc is utilized for removing an offset value of the tracking error signal.

The optical system for the return light is enclosed in an optical pickup employing a sole light spot. The forward light outgoing from, for example, a laser source, reaches a signal recording surface of a magneto-optical disc D1. A return light L, reflected from the magneto-optical disc, is received by two photodetectors PD1, PD2, operating as light receiving portions.

These photodetectors PD1, PD2 convert the received return light into current. The currents from the photodetectors PD1, PD2 are used directly as current signals. The voltage or current signals are sent as output of the optical pickup to a next-stage signal processing circuit.

Figure 4:
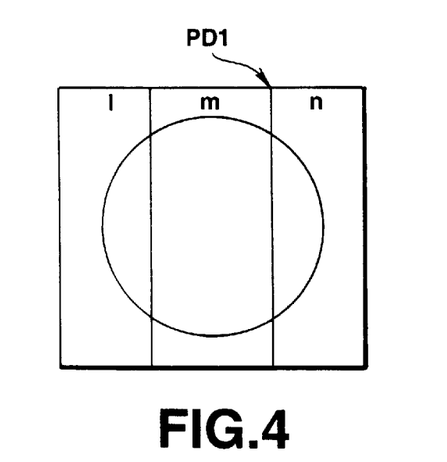
FIG. 4 shows an illustrative three-segment photodetector operating as a light receiving unit.
Figure 5:
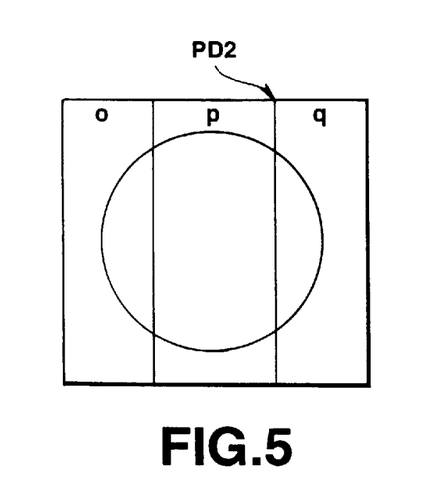
FIG. 5 shows another illustrative three-segment photodetector operating as a light receiving unit.

The photodetectors PD1, PD2 are split in three or four strip-like segments extending along the track direction. FIGS. 4 and 5 illustrate the three-segment photodetectors PD1 and PD2. The photodetector PD1 of FIG. 4 is made up of segmented sensors l, m and n. Similarly, the photodetector PD2 is made up of segmented sensors o, p and q.

Figure 6:
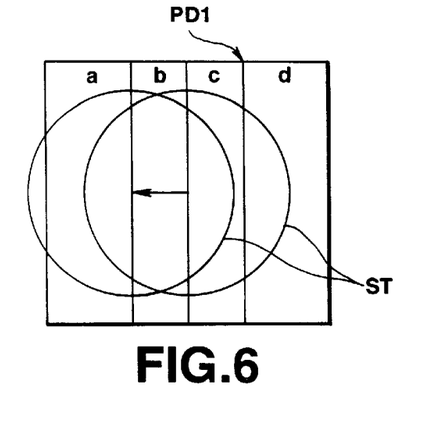
FIG. 6 shows an illustrative four-segment photodetector.

The photodetector PD1 shown in FIG. 6 is split in four segmented sensors a, b, c, d, extending along the track direction. The photodetector PD2 shown in FIG. 5 is split in four segmented sensors h, g, f, e.

If the tracking servo system is constituted by the push-pull system using the three-segment photodetectors PD1, PD2 of FIGS. 4 and 5, the tracking error TE may be obtained by the following equation (2):

$$TE=(l+q)-(n+o) \qquad (2)$$

Figure 7:
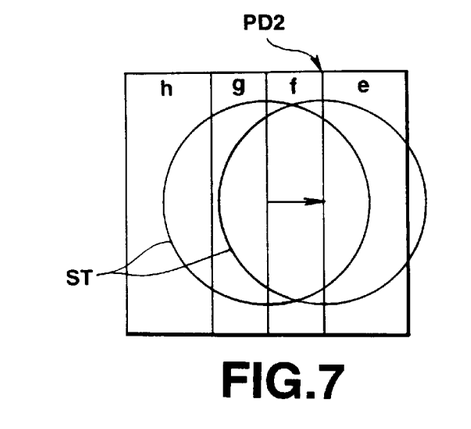
FIG. 7 shows another illustrative four-segment photodetector.

If the tracking servo system is constituted by the push-pull system using the four-segment photodetectors PD1, PD2 of FIGS. 6 and 7, the tracking error TE may be obtained by the following equation (3) or (4):

$$TE=(a+b+e+f)-(c+d+g+h) \qquad (3)$$

$$TE=(a+e)-(d+h) \qquad (4)$$

The codes a to h and l to q in the equations (2), (3) and (4) represent signals detected by the segmented photodetector sensors a to h and l to q, respectively. If the photodetectors PD1, PD2 are of the four segment type as shown in FIGS. 6 and 7, the equation (3) or (4) is used, whereas, if the photodetectors PD1, PD2 are of the three segment type as shown in FIGS. 4 and 5, the equation (2) is used.

The following description is made for a case of using the four-segment photodetectors PD1, PD2 shown in FIGS. 6 and 7. If the three-segment photodetector shown in FIG. 3 or FIG. 4 is used, the following description applies if c and g in the following description are neglected.

Figure 8:
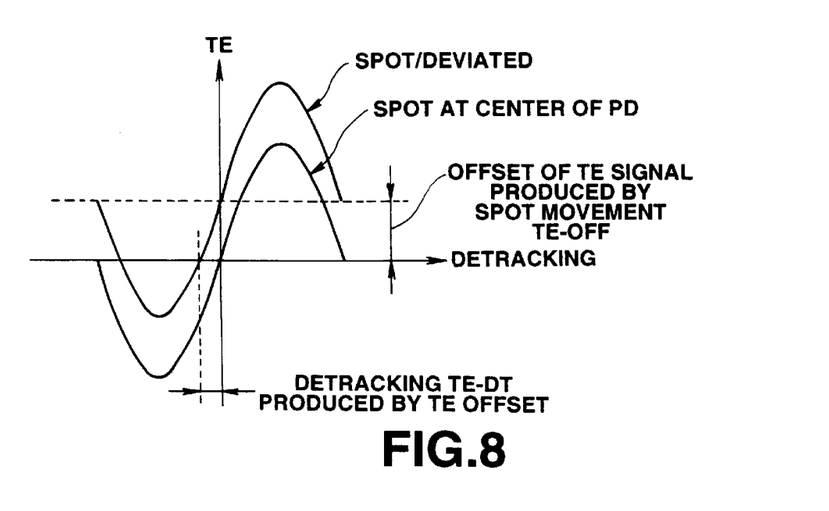
FIG. 8 illustrates movement of a light spot caused with movement of an objective lens.

If, in the optical system of the return light of FIG. 3, the objective lens of the optical pickup is moved, a spot ST on the photodetectors PD1 or PD2 is moved to produce an offset in the tracking error signal TE, thus causing the spot ST on the magneto-optical disc to be deviated from the data track to produce a detracking phenomenon (FIG. 8). For avoiding this detracking, it is necessary to detect the position of the objective lens of the optical pickup, to estimate an offset produced in the tracking error signal TE therefrom and to subtract the offset from the tracking error signal TE by signal processing.

If wobbling is formed on a data track of a magneto-optical disc, that is if the meandering data track state exists, the wobbled frequency components are contained in the photodetector signals a to h, while the amplitude is changed with the object lens position. The system of utilizing this to detect the objective lens position for canceling the offset value produced in the tracking error signal TE is the wobble push-pull (WPP) method. The following equation (5):

$$TE = \frac{(a+e)-(d+h)}{IG} - KW \cdot \frac{(a+e)w-(d+h)w}{\{(a+e)-(d+h)\}w} \qquad (5)$$

The first term of the right side of the equation (5) is the tracking error signal TE normalized with respect to the total light volume IG. The second term of the right side of the equation (5) is the objective lens position detected from the wobbled component amplitude calculated into an offset produced in the tracking error signal TG, that is a cancellation signal portion used for canceling the offset produced in the first term of the right side.

Figure 9:
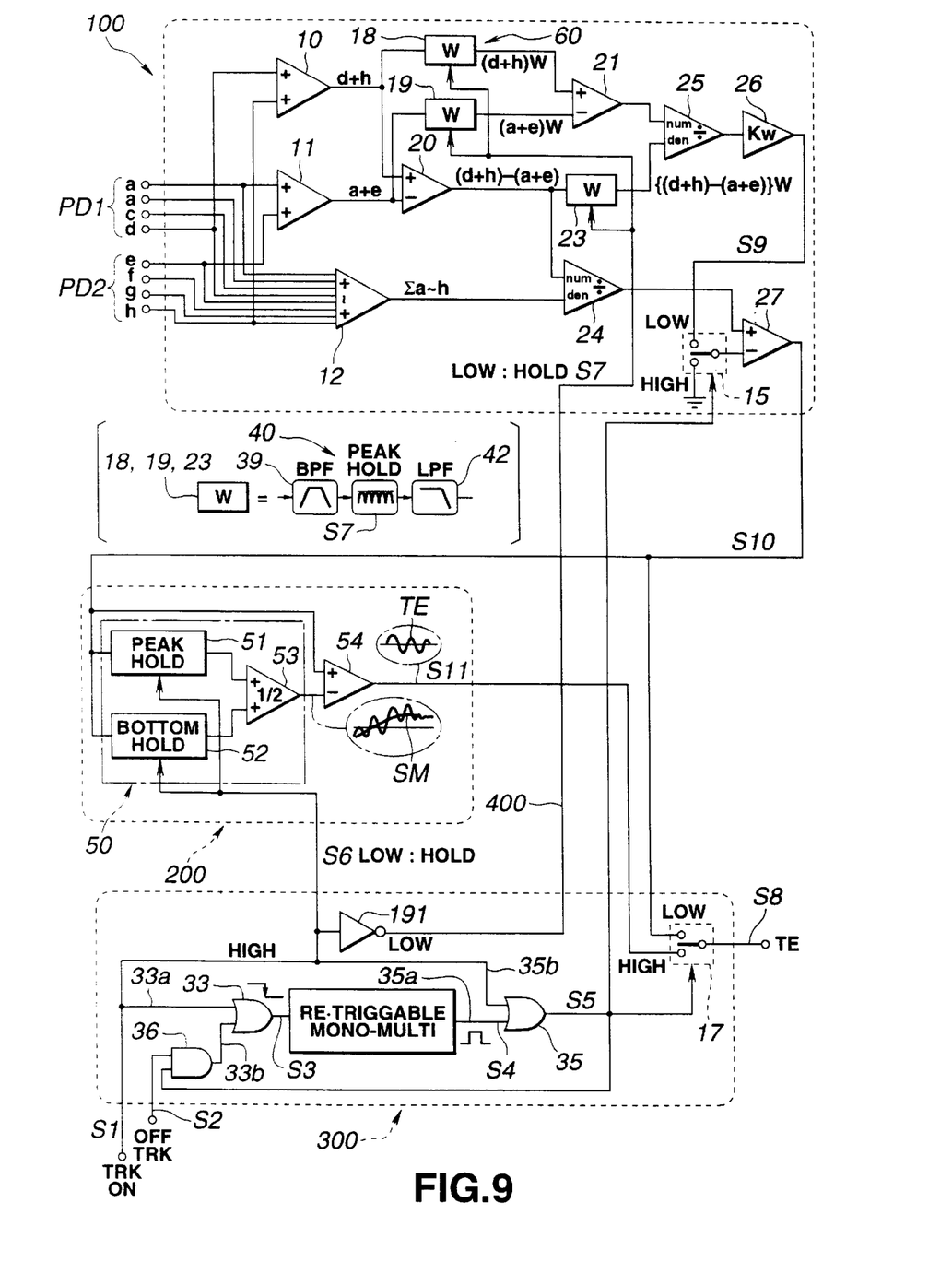
FIG. 9 is a circuit diagram of a tracking servo device according to a first embodiment of the present invention.

A preferred example of the WPP circuit for carrying out the calculations of the equation (5) is a wobble push-pull circuit 100 (WPP circuit 100) of the tracking servo device in the optical apparatus shown in FIG. 9.

The tracking servo device in the optical apparatus according to the first embodiment of the present invention shown in FIG. 9 is made up of the WPP circuit 100, a track-on circuit 200 and a cancellation circuit changeover circuit 300. The WPP circuit 100 is first correction means and the track-on circuit 200 is second correction means.

The WPP circuit 100 can be used when the tracking servo is on, while it cannot be used if the tracking servo is off. It is the track-on circuit 200 of FIG. 9 that supplements the function of the WPP circuit 100 when the tracking servo is off. This tack-on circuit detects the peak level and the bottom level of the tracking error signal TE when the tracking servo is off and subtracts a mean value (offset) of the peak and bottom levels from the tracking error signal TE to produce the tracking error signal TE in which the offset has been canceled.

The changeover circuit 300 has the function of switching between the WPP circuit 100 and the track-on circuit 200 performing the role of the cancellation circuit by the tracking servo on/off state. That is, the changeover circuit 300 derives the correct tracking error signal TE from the WPP circuit 100 or the track-on circuit 200 if the tracking servo is on or off, respectively.

WPP Circuit 100

The WPP circuit 100 of FIG. 9 is first explained.

The EPP circuit 100 includes matrix amplifiers 10 and 11 and an addition amplifier 12. The matrix amplifier 10 is connected to the segmented sensor d of the photodetector PD1 and to the segmented sensor h of the photodetector PD2. Similarly, the amplifier 11 is connected to the sensors a and e. The amplifier 12 is connected to the sensors a to h. Thus the matrix amplifier 10 sends the photodetector signal (d+h) to a detector 18 of a wobbled amplitude detector 60 and to a non-inverting terminal of the differential amplifier 20 and to a detector 18 of a wobbled amplitude detection unit 60. Similarly, the matrix amplifier 11 sends the photodetector signal (a+e) to a detector 19 and to an inverting terminal of a differential amplifier 20. The addition amplifier 12 sends all of the photodetector signals a to h to a denominator side of a divider 24.

The detectors of the wobbled amplitude detection unit 60 are provided with a band-pass filter 39, a peak-hold circuit 40 and a low-pass filter 42. The signals entering the detectors 18, 19, 23 are first freed of high-frequency components and low-frequency components by the band-pass filter 39 and peak-held by a peak-hold unit 41 so as to be then freed of the high-frequency components by the low-pass filter 42.

The detectors 18 and 19 are connected to a non-inverting terminal and an inverting terminal of a differential amplifier 21, respectively. The detector 18 sends a signal (d+h)w signal in the photodetector signal (d+h) representing wobbled frequency components to the differential amplifier 21. Similarly, the detector 19 sends a signal (a+e)w signal representing wobbled frequency components to the differential amplifier 21. The detector 23 sends a signal ((d+h)− (a+e))w in (d+h)−(a+e) supplied from the differential amplifier 20 to the denominator side of a divider 25. The divider 25 generates the second term of the right side of the equation (5), usable for canceling the offset value of the first term, in cooperation with an amplifier 26 adapted for generating a calculation coefficient for gain KW, to form the WPP cancellation signal S9.

The divider 24 calculates the first term of the right side of the equation (5) based on an output of the differential amplifier 20 and an output of the addition amplifier 12. The differential amplifier 27 finds a difference between the output of the calculation coefficient amplifier 26 (second term of the right side of the equation (5)) and the output of the divider 24 (first term of the right side of the equation (5)) to output the output S10 of the WPP circuit equivalent to the tracking error signal TE. The output S10 of the WPP circuit is supplied to the non-inverting terminal of the differential amplifier 54, peak-hold circuit 51 and to the bottom hold circuit 52 of the next track-on circuit 200, while being also sent to a low-side terminal of a second switch 17 of the changeover circuit 300.

The inverting terminal side of the differential amplifier 27 is provided with a first switch 15 which may be changed over from a ground or high-side and a calculation coefficient amplifier side or low side of the second switch 17.

Track-on Circuit 200

The track-on circuit 200 of FIG. 9 supplements the function of the WPP circuit 100 which cannot be used when tracking servo is off. That is, the track-on circuit 200 operates when track servo is off to output a correct tracking error signal TE.

The track-on circuit 200 has the peak-hold circuit 51 and the bottom hold circuit 52 which are connected to an intermediate value calculation unit 53 in turn connected to an inverting terminal of the differential amplifier 54. The output S10 of the WPP circuit is supplied to the non-inverting terminal of the differential amplifier 54, as explained previously. These circuits 51 and 52 and the intermediate value calculation unit 53 make up a unit for extracting an offset of the tracking error signal 50.

The intermediate value calculation unit 53 is adapted for calculating an intermediate value between the peak hold value of the peak hold circuit 51 and the bottom hold value of the bottom hold circuit 52. The differential amplifier 54 finds the difference between the output S10 of the WPP circuit and the output of the intermediate value calculation unit 53 to output a track-on circuit output S11 to the high-side of the second switch 17.

The extraction unit 50 outputs, as an offset of the tracking error signal, an intermediate value SM between the peak-hold value and the bottom-hold value. The intermediate value SM, shown with a solid line, interconnects intermediate values of respective waveforms in the tracking error signal TE carrying an offset value. This intermediate value is generated in consideration that it is extremely close to the offset. Therefore, by subtracting the intermediate value SM from the output S10 of the WPP circuit, the correct tracking error signal TE freed of the offset may be derived as a track-on circuit output S11.

Changeover Circuit 300

Figure 10:
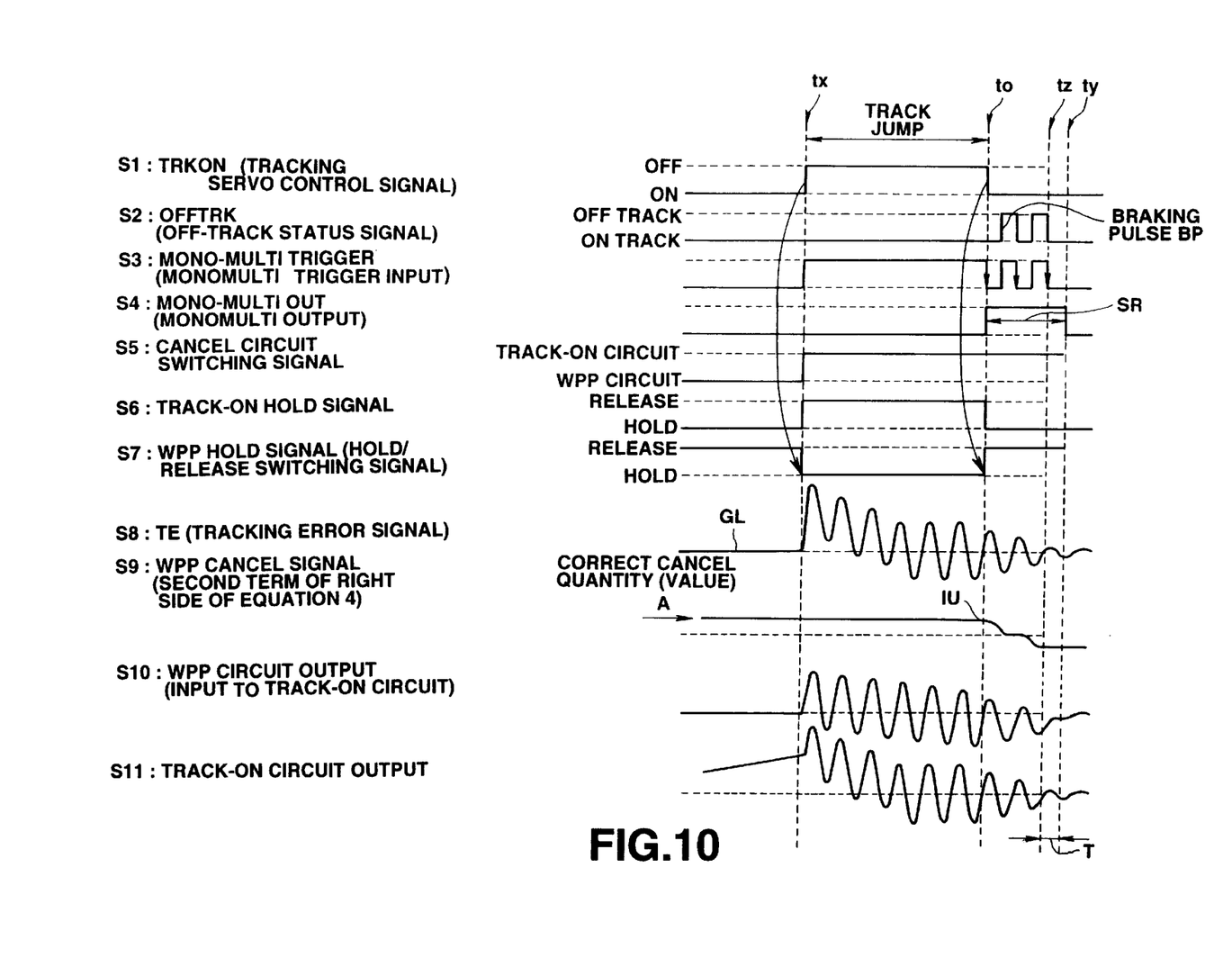
FIG. 10 shows signal waveforms at various portions of the tracking servo device shown in FIG. 7.

The changeover circuit 300 includes a first OR gate 33, a second OR gate 35 and an AND gate 36 along with a retriggerable monomultivibrator 34 arranged between the gates 33 and 34, as shown in FIG. 9. The retriggerable monomultivibrator 34 is also termed a timing circuit and an output signal thereof is supplied to an input terminal 35a of the OR gate 35. When fed with an input S3 as shown in FIG. 10, the retriggerable monomultivibrator 34 outputs a monomultivibrator output S4 to the OR gate 35. The monomultivibrator output S4 is high only for a time period SR corresponding to the response time of the WPP circuit 100 since decay of the signal S3, such as 5 milliseconds.

To an input terminal 35b of the OR gate 35 and to an input terminal 33b of the OR gate 33 is supplied a tracking servo control signal S1. To an input terminal of the AND gate 36 is supplied an off-track state signal S2. An output of the OR gate 35 is coupled to the opposite side input terminal of the AND gate 36.

The first switch 15 of the WPP circuit 100 is adapted for turning cancellation of the offset value by the WPP circuit 100 on or off. The first switch 15 is changed over to the side of the calculation coefficient amplifier 26 and to the ground side if the output of the changeover circuit 300 is low or high, respectively.

The second switch 17 is adapted for turning the cancellation of the offset value by the track-on circuit 200 on or off. The second switch 17 is changed over to the side of the differential amplifier 27 of the WPP circuit 100 or to the side of the differential amplifier 27 of the WPP circuit 100 if the output of the OR gate 35 of the changeover circuit 300 (cancellation circuit switching signal S5) is low or high, respectively.

Holding Means 400

FIG. 9 shows holding means 400 having an inverting element 191. To the input side of the inverting element 191 and to the peak hold circuit 51 and the bottom hold circuit 52 of the track-on circuit 200 is supplied a tracking servo control signal S1. The inverting element inverts the tracking servo control signal S1 to supply the inverted signal to the three detectors 18, 19, 23 of the WPP circuit 100.

If the output of the inverting element 191 is at a low level, this low-level signal is sent as WPP hold signal S7 to the peak hold circuit 40 of each of the detectors 18, 19 and 23. If the tracking servo control signal S1 is at a low level, the low-level signal is supplied as track-on hold signal S6 to the peak hold circuit 51 and to the bottom hold circuit 52 of the track-on circuit 200.

This holding means 400 holds the peak-hold value in the peak-hold circuit 40 of the wobbled amplitude detection unit 60 of the WPP circuit 100 as first correction means for holding the cancellation value for canceling the offset in the WPP circuit 100 during track servo-off.

That is, the holding means supply the WPP hold signal S7 to the peak hold circuit 40 of each of the three detectors 18, 19 and 23 of the wobbled amplitude detection unit 60 for maintaining the function of holding the peak hold value. Specifically, the capacitor for peak-hold is maintained at a high impedance in the manner similar to that used for the track-on circuit 200 for maintaining the capacitor potential.

The leakage current from the capacitor during the hold time can be suppressed to a level negligible in circuit designing because the required hold time corresponds to the track jump period (tracking servo off period or tx to t0 period in FIG. 8) and is significantly shorter than the tracking servo on time, such as tens of milliseconds.

The operation of the above-described first embodiment is now explained.

The timing chart of the operation of the tracking servo device of FIG. 9 is shown in FIG. 10. If the optical pickup, not shown, is actuated for radiating a laser light beam on the magneto-optical disc, the return light beam L from the signal recording surface of the magneto-optical disc falls on the photodetectors PD1, PD2 for detecting the tracking error signal TE of the push-pull system. The photodetector signals from the sensors a to h of the photodetectors PD1, PD2 are supplied to the WPP circuit 100.

The tracking servo control signal S1 and the off-track status signal S2 are supplied to the changeover circuit 300. The tracking servo control signal (TRKON) signal S1 is at a low level and at a high level for the tracking servo on state and for the tracking servo off state, respectively. The tracking servo off state (time points tx to t0) corresponds to the time for track jump from a given track to a separate track. During this track jump, tracking servo is turned off.

The waveforms of FIG. 10 represent the states of signals of respective parts since the time the tracking servo is changed over from the on state to the off state and track jump is made by moving the objective lens until the time the tracking servo is again turned on.

The off-track state signal S2 is a signal apprising the off-track state and is used for improving the recovery characteristics at the time point t0 directly after turning on of the tracking servo. The signal S2 is also termed a braking pulse used for a braking circuit. This off-track state signal S2 is low and high during on-track and off-track, respectively.

The monomultivibrator triggering input S3 of FIG. 19 is generated by the OR gate 33 of FIG. 9 in association with one of the tracking servo control signal S1 and the off-track state signal S2, respectively.

The monomultivibrator output S4 can output a high-level signal during the pre-set time SR since the decay of the tracking servo control signal S1 at time point t10.

The cancellation circuit changeover signal S5 is outputted by the OR gate 35 for switching between the first switch 15 of the WPP circuit 100 and the second switch 17 of the changeover circuit 300. If the changeover signal S5 is low, the switches 15, 17 are connected to the differential amplifier 27 of the WPP circuit 100, so that the tracking error signal TE is produced from the WPP circuit output S10 of the WPP circuit 100.

Conversely, with the changeover signal S5 in the high state, both the switches 15, 17 are changed over to the high side, so that the track-on circuit output S11 of the track-on circuit 200 is obtained as the tracking error signal TE. Since the changeover signal S5 is a waveform obtained by passing the tracking servo control signal S1 and the monomultivibrator output S4 through the OR gate 35, the changeover signal S5 continues to be high from a time point tx through a time point t0 up to a time point ty.

The track-n hold signal S6 of FIG. 10 is synchronized with the tracking servo control signal S1 and inverted with respect to the WPP hold signal S7. The reason the track-on hold signal is inverted in this manner is that the inverting element 191 of the holding means 400 inverts the tracking servo control signal S1 to generate the WPP hold signal S7.

If the track-on hold signal S6 and the WPP hold signal S7 are both low, the hold signal S7 holds the peak hold values of the peak-hold circuits 40 of the detectors 18, 19 and 23. Moreover, the hold signal S6 holds the peak hold values of the peak hold circuit 51 and the bottom hold values of the bottom hold circuit 52. If the hold signals S6 and S7 are high, the holding of the peak hold values of the peak hold circuit 51 and the bottom hold value of the bottom hold circuit 52 is canceled.

The cancellation circuit changeover signal S5 causes the track-on circuit output S11 of the track-on circuit 200 to be issued as the tracking error signal TE during the time the tracking servo is off (time tx to t0) and during the time since the tracking servo is on until the braking pulse subsides and the WPP circuit 100 operates correctly (time t0 until time ty). Otherwise, the cancellation circuit changeover circuit S5 causes the WPP circuit output S10 of the WPP circuit 100 to be issued as the tracking error signal TE. The WPP hold signal S7 holds the peak-hold value of the peak-hold circuit 40 during time since the time instant the tracking servo is turned off until the tracking servo is next turned on (time tx until time t0).

The tracking error signal TE (S8) is a waveform which is oscillated vertically during tracking servo off about the ground line GL as center and which decays during the time SR until it is substantially stationary after time ty.

The WPP canceling signal S9 of FIG. 10 is equivalent to the second term of the right side of the equation (5). The WPP canceling signal S9 represents a correct cancellation value A during tracking servo on time. This cancellation value A is held even during the tracking servo off period (time tx until t0).

That is, the WPP hold signal S7 is applied to the peak hold circuit 40 of FIG. 9. The peak hold circuit 40 continuously holds the cancellation amount A as the peak hold value since time pint tx until time point t0. That us, the cancellation quantity A of the WPP circuit 100 (the cancellation value for canceling the offset value A of the tracking error signal) is maintained at a constant value since the time when the tracking servo is on through the time point the tracking servo is off at tx until the tracking servo off comes to an end at time t0.

Since the cancellation value of the WPP circuit 100 (WPP canceling signal S9) is held during track jump when the tracking servo is off, the value thus held becomes an initial value IU when the WPP circuit 100 is used next time, that is when the tracking servo is on next time.

Consequently, the time T since the tracking servo is changed over from the off state to the on state and rotation of the magneto-optical disc is locked to CLV at time tz in FIG. 10 until the WPP circuit output S10 of the WPP circuit 100 gives a correct value can be reduced as compared to the time t1 shown in the comparative example of FIG. 2.

Since the WPP circuit output S10, which is also the input to the track-on circuit 200, acts on the track-on circuit 200 during the tracking servo off period (time tx until time t0), the differential amplifier 54 of the track-on circuit 200 cancels the offset value of the tracking error signal.

Second Embodiment

Figure 11:
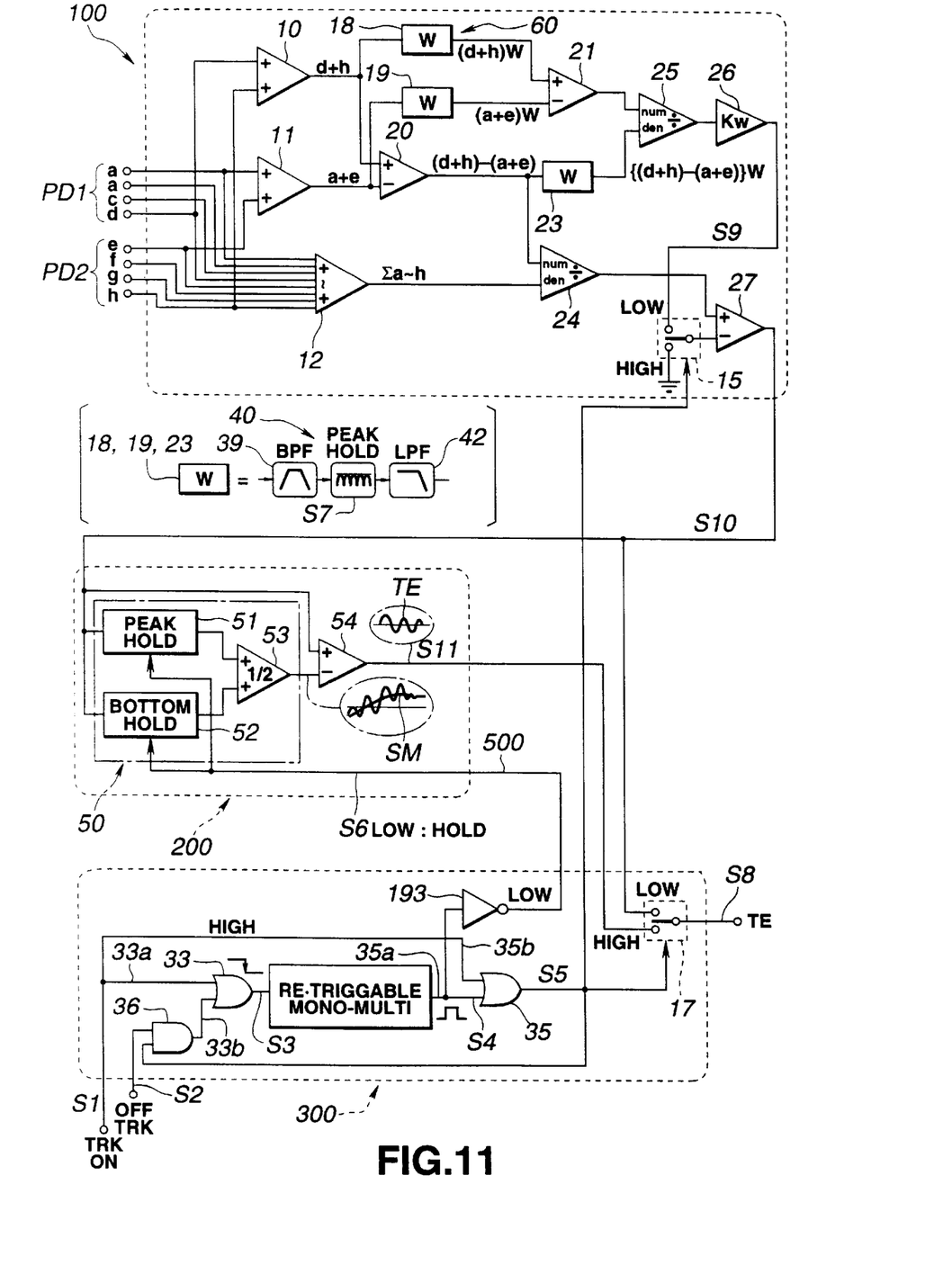
FIG. 11 is a circuit diagram of a tracking servo device according to a second embodiment of the present invention.

FIG. 11 shows a second embodiment of the present invention.

In the second embodiment, shown in FIG. 11, holding time setting means 500 is provided in place of the holding means 400 of the embodiment shown in FIG. 9. Since the elements of the embodiment of FIG. 11 are otherwise the same as those of the embodiment shown in FIG. 9, these elements are denoted by the same reference numerals and the corresponding description is omitted for simplicity.

Figure 12:
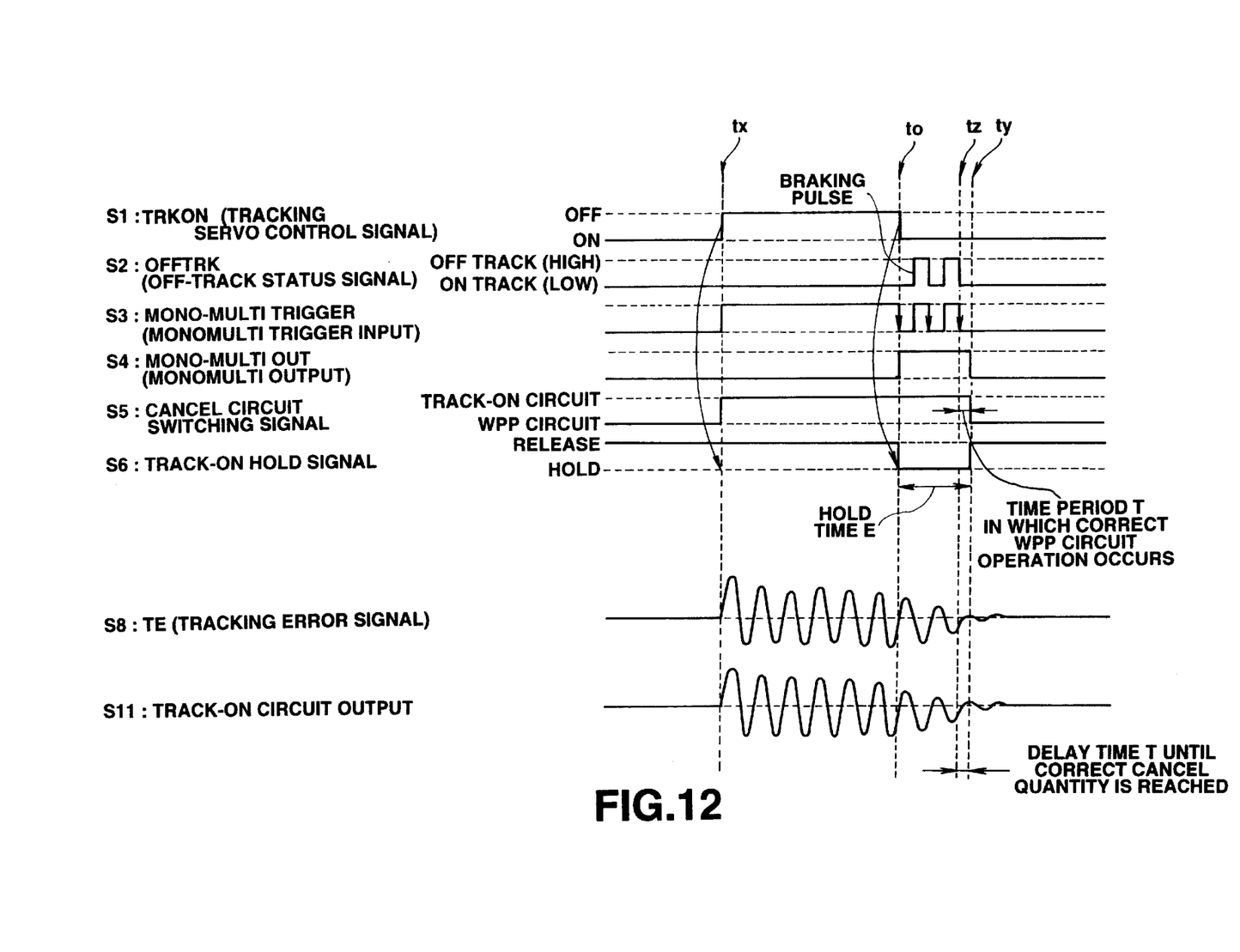
FIG. 12 shows signal waveforms at various portions of the tracking servo device shown in FIG. 9.

With the hold time setting means 500, shown in FIG. 11, an inverting element 193 has its input and its output connected to the monomultivibrator output S4 shown in FIG. 12 and to the peak hold circuit 51 and the bottom hold circuit 52 of the track-on circuit 200, respectively.

The hold time setting means 500 inverts the monomultivibrator output S4 of FIG. 12 to generate the track-on hold signal S6. That is, the track-on hold signal S6 is kept in a release state through time point tx until time point t0 and is changed from the high state to the low state at the time point t0 corresponding to decay of the tracking servo control signal S1. The track-on hold signal keeps on to be low through time point tz until time point ty.

The low state of the track-on hold signal S6 is the hold time E of holding the hold values of the peak hold circuit 51 and the bottom hold circuit 52. The hold time E of holding the peak hold value of the peak hold circuit 51 of the track-on circuit 200 and of holding the bottom hold value of the bottom hold circuit 52 thereof can be set to a time period beginning from an instant when the tracking servo is turned on at time point t0 and terminating at a time point ty when the WPP circuit 100 is set as cancellation circuit and the output S10 of the WPP circuit 100 operates correctly. The hold time E can be previously set by estimating the time since time point t0 until time point ty.

Since the hold time can be set to a pre-set time period, the potential of the holding capacitor of the track-on circuit 200 is fluctuated to a lesser extent. Moreover, track counting errors by track counting means, not shown, during track jump may be prohibited, while there is no necessity of repeating track jumps in the forward and reverse directions for searching a target track. The result is the shorter access time during track jump, that is the shorter time period since the tracking servo is turned off until the cancellation quantity of the track-on circuit gives a correct value.

Third Embodiment

Figure 13:
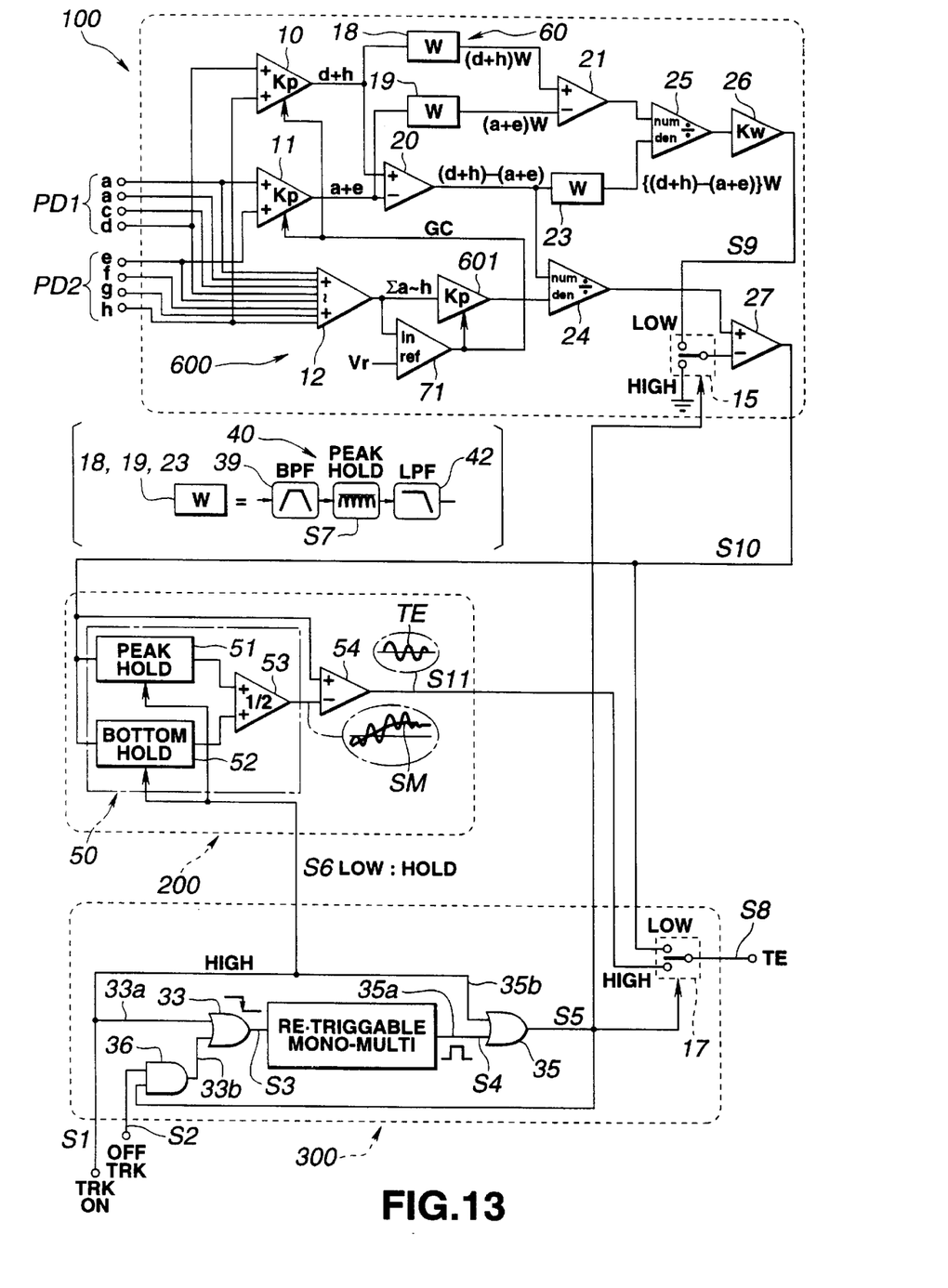
FIG. 13 is a circuit diagram of a tracking servo device according to a third embodiment of the present invention.

FIG. 13 shows a third embodiment of the present invention.

In the third embodiment, shown in FIG. 13, discrimination adjustment means 600 is provided in the WPP circuit 100 in place of the holding means 400 or the hold time setting means 500 of FIG. 9. Since the elements of the embodiment of FIG. 13 are otherwise the same as those of the embodiment shown in FIG. 9 or 11, these elements are denoted by the same reference numerals and the corresponding description is omitted for simplicity. The discrimination adjustment means 600 judges, based on the output signal level of the sensors a to h, whether the laser light radiated on the magneto-optical disc is in the recording mode or in the playback mode, and adjusts the output signal level of the sensors to be supplied to the WPP circuit 100.

The discrimination adjustment means 600 is provided between the addition amplifier 12 and the divider 24. An output side of the 8-channel addition amplifier 12 is connected to the input of the divider 24 via calculation coefficient amplifier 601. The comparator 71 has an input terminal and a reference terminal connected to the addition amplifier 12 and to the reference level Vr, respectively. The gain changeover signal GC outputted by the comparator 71 is supplied to the amplifier 601 and to the matrix amplifiers 10, 11. This amplifier 601 is the second-stage amplifier for the total light volume (IG).

The light volume of the return light received by the segmented sensors a to h is compared by the comparator 71 to the reference level Vr. If the return light volume is larger or smaller than the reference level Vr, the laser light radiated on the magneto-optical disc is judged to be in the recording mode or in the playback mode, respectively. The comparator 71 changes over the gain of the matrix amplifiers 10, 11 and the second-stage amplifier 601 depending on whether the mode of the laser light is the recording mode or the playback mode. By comparing the output levels of the photodetectors PD1, PD2 to a pre-set threshold value for judging whether the laser light radiated on the magneto-optical disc is in the recording mode or in the playback mode, and by changing over the gain of the input signal to the WPP circuit 100 as the offset cancellation circuit, the dynamic range of the calculation circuits 60, 24 and 25 can be used effectively for improving the calculation accuracy and hence the accuracy in the tracking servo operations.

Fourth Embodiment

Figure 14:
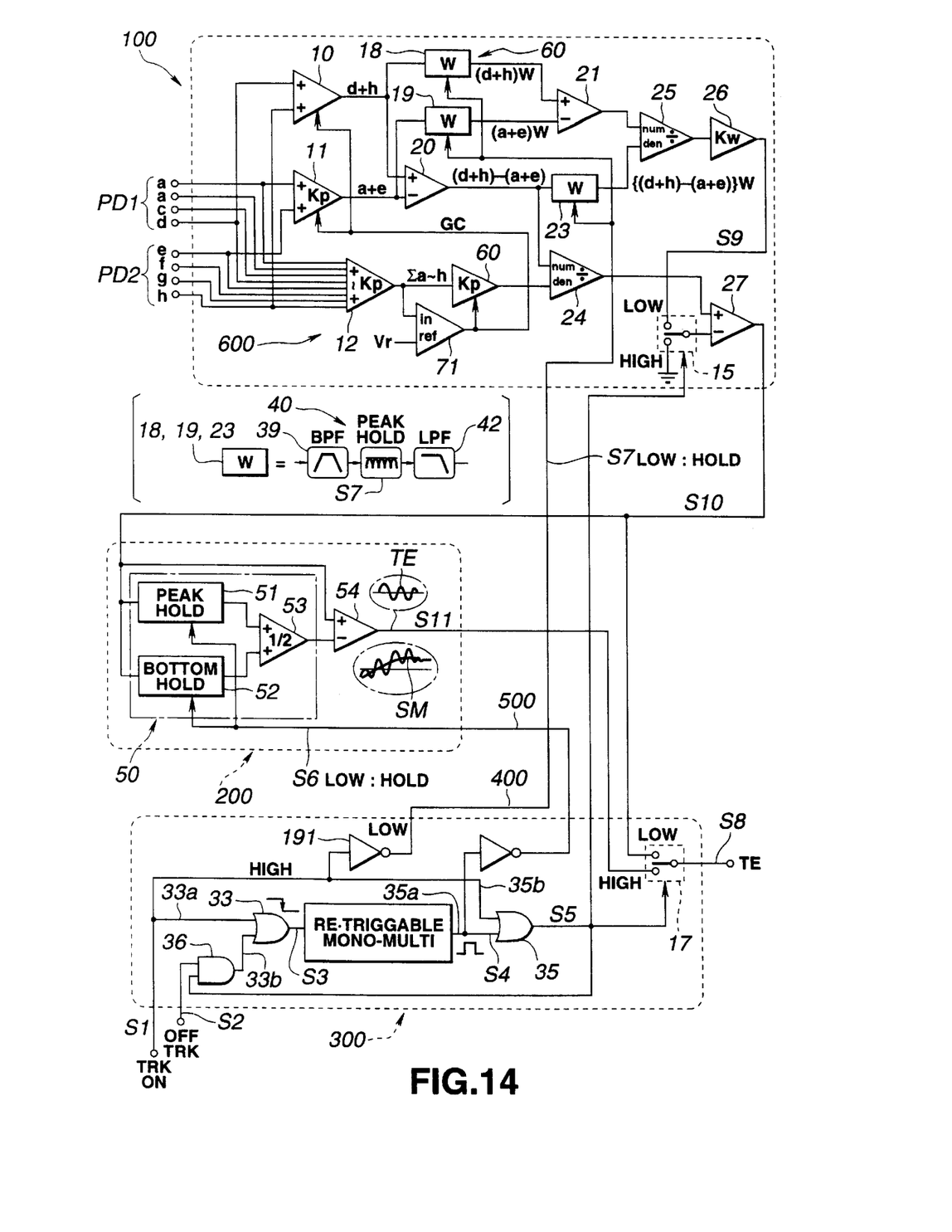
FIG. 14 is a circuit diagram of a tracking servo device according to a fourth embodiment of the present invention.

FIG. 14 shows a fourth embodiment of the present invention.

FIG. 14 shows a tracking servo device which resides in the combination of the embodiments of FIGS. 9, 11 an 13.

Thus the tracking servo device of FIG. 14 includes the WPP circuit 100, track-on circuit 200, changeover circuit 300, holding means 400, holding time setting means 500 and the discrimination adjustment means 600.

Figure 15:
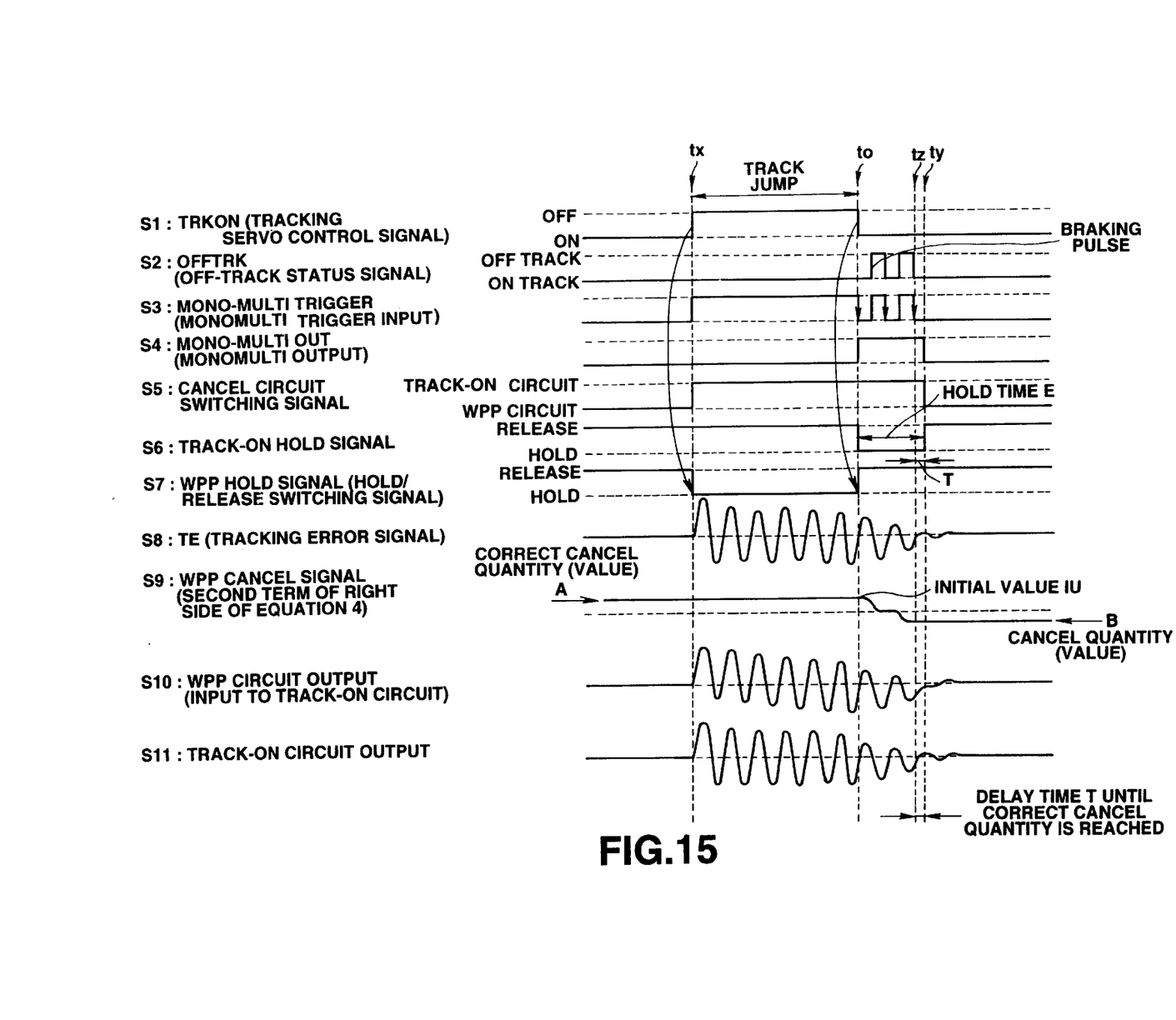
FIG. 15 shows signal waveforms at various portions of the tracking servo device shown in FIG. 12.

FIG. 15 shows waveforms of various portions of FIG. 14.

The holding means 400 shown in FIG. 7 is provided in the fourth embodiment shown in FIG. 14, as previously explained. Thus the cancellation value A of the WPP cancellation signal S9 directly preceding transition of the tracking servo control signal S1 from the on state to the off state can be maintained even if the tracking servo control signal S1 is off, as during the track jump during the time period tx to t0. Consequently, the cancellation value of the WPP circuit 100 thus held can be used as the initial value IU after time point t0 when the WPP circuit 100 is used next, that is when the tracking servo is turned on next time.

In the comparative example shown in FIG. 2, the cancellation value is deviated significantly from the cancellation value A of the WPP circuit during track jump in the comparative example of FIG. 2 at time t0 when the tracking servo is on, thus protracting the time reburied for track jump. In the embodiment shown in FIG. 15, the track jump time can be reduced.

Also, in the fourth embodiment shown in FIG. 14, since the holding time setting means 500 of FIG. 14 is provided, the track-on hold signal S6 is obtained as an inverted signal of the monomultivibrator output S4. Consequently, the offset value hold time E of the track-on circuit 200 is limited to the time period since the time point t0 when the tracking servo is turned on until time point ty when the WPP circuit 100 is set as cancellation circuit and the WPP circuit output S10 gives a correct value (cancellation value B). The result is that fluctuations in the potential of the hold capacitor of the peak hold circuit 51 and the bottom hold circuit 52 can be prevented such that track count errors produced in the track-on circuit output S11 of the comparative example of FIG. 2 at time period t3 can be prohibited from occurring, and hence the track jump time can be reduced.

The above-described fourth embodiment, shown in FIG. 14, may be provided with discrimination adjustment means 600, in which case output levels of the photodetectors PD1, PD2 can be compared to a threshold value for judging whether the light radiated on the magneto-optical disc is in the recording mode or in the reproducing mode for switching the gain of the input signal to the input of the WPP circuit 100 as the offset cancellation circuit. Consequently, the tracking error signal of higher accuracy may be produced by the WPP circuit 100, and hence the tracking servo may be improved in accuracy.

Meanwhile, in the embodiment of FIGS. 9 and 10, the WPP cancellation signal S9 can be improved to the WPP cancellation signal S9 of FIGS. 10 and 15, while the time period t1 of FIG. 2 can be reduced to a time period T in FIGS. 10 and 15, thus enabling the track jump period to be reduced.

Also, with the embodiment shown in FIGS. 11 and 12, the tracking error signal S8 and the track-on circuit output S11 of the comparative example of FIG. 2 can be improved to the tracking error signal S8 and to the track-on circuit output S11 as shown in FIG. 15, respectively, thus preventing track count errors. That is, track jump need not be re-tried thus reducing the track jump period. Meanwhile, the WPP cancellation signal S9 cannot be improved with the embodiment shown in FIGS. 11 and 12.

The above-described tracking servo device of the present invention is of a one-spot push-pull tracking error servo system in which the wobbling in the optical disc track is exploited for removing the offset in the tracking error signal. The changeover circuit 300 is used for switching between the WPP circuit 100 used during tracking servo on period and the track-on circuit 200 used during track-off period, while the recording mode and the playback mode of the optical disc such as the magneto-optical disc may be discriminated for expediting the track jump and improving tracking servo accuracy.

The present invention is not limited to the above-described embodiments.

For example, a full-wave rectifier circuit may be used as a peak-hold circuit 40 of the wobbling amplitude detection circuit 60 shown in FIGS. 9, 11, 12 and 14.

In discriminating the recording and playback modes, it is unnecessary to use the totality of the segmented sensors and the level of the total light volume IG. Instead, the recording/playback mode of the magneto-optical disc may be judged by the discrimination adjustment means 600 based on calculated results of output signals of one or more sensors.

The recording/playback mode in the first and second embodiments may also be discriminated on the basis of a control signal from the main controller without employing the discrimination adjustment means 600 of the present embodiment.

I claim:

1. A tracking servo apparatus for an optical disc comprising:

photodetector means having a plurality of photodetectors each of which is split in association with the direction of tracks formed on the optical disc;

tracking error generating means for finding the difference in outputs from at least two of the photodetectors of said photodetector means for generating a tracking error signal;

first correction means for removing an offset produced in said tracking error signal when the tracking servo is on;

second correction means for removing an offset produced in said tracking error signal when the tracking servo is off; switching means for selecting said first correction means or said second correction means when the tracking servo is on or off, respectively, for producing a tracking error signal freed of an offset component;

adjustment means for detecting a laser power of laser light radiated on the optical disc based on the output signal level of the photodetector means for adjusting the output signal level of said photodetector means; and holding means for holding a cancellation value for canceling an offset component extracted by said first first correction means.

2. The tracking servo apparatus as claimed in claim 1 wherein said first correction means is configured for extracting an offset component generated in the tracking error signal from the tracking error signal generating means based on wobbling frequency components of a wobbled groove formed on the optical disc.

3. The tracking servo apparatus as claimed in claim 1 wherein said second correction means comprises offset component extracting means having a peak hold circuit for peak holding the tracking error signal from said tracking error signal generating means, a bottom hold circuit for bottom holding the tracking error signal from said tracking error signal generating means, and a calculation circuit for finding a mean value between an output signal of said peak hold circuit and an output signal of said bottom hold circuit.

4. The tracking servo apparatus as claimed in claim 1 wherein an output signal adjusted for level by said adjustment means enters said first correction means.

* * * * *